United States Patent [19]

Ikegami

[11] Patent Number: 4,933,950
[45] Date of Patent: Jun. 12, 1990

[54] GENERATING METHOD FOR FREE POSITRONIUM RADIATION LIGHT AND APPARATUS USED IN THIS METHOD

[76] Inventor: Hidetsugu Ikegami, 12-50, Hibarigaoka 2-chome, Takarazuka-shi, Hyogo 665, Japan

[21] Appl. No.: 265,682
[22] PCT Filed: Feb. 24, 1988
[86] PCT No.: PCT/JP88/00191
    § 371 Date: Oct. 20, 1988
    § 102(e) Date: Oct. 20, 1988
[87] PCT Pub. No.: WO88/06812
    PCT Pub. Date: Sep. 7, 1988

[30] Foreign Application Priority Data

Feb. 24, 1987 [JP] Japan .................. 62-39053

[51] Int. Cl.$^5$ ............................................. H01S 3/09
[52] U.S. Cl. ........................................ 372/73; 372/2
[58] Field of Search ............... 372/2, 74, 73, 69, 70, 372/5

[56] References Cited

U.S. PATENT DOCUMENTS

| 4,189,686 | 2/1980 | Brau et al. . | |
| 4,205,268 | 5/1980 | Eerkens | 372/5 |
| 4,287,488 | 9/1981 | Brau et al. . | |
| 4,323,857 | 4/1982 | Brau et al. . | |
| 4,479,218 | 10/1984 | Brau et al. . | |
| 4,529,942 | 7/1985 | Patel et al. . | |
| 4,740,973 | 4/1988 | Madey et al. | 372/2 |

FOREIGN PATENT DOCUMENTS

0022093 6/1980 European Pat. Off. .

OTHER PUBLICATIONS

International Search Report PCT/JP88/00191.

Primary Examiner—Léon Scott, Jr.
Attorney, Agent, or Firm—Burns, Doane, Swecker & Mathis

[57] ABSTRACT

An electron beam and a positron beam are separately accelerated and stored to a predetermined energy, both beams are joined (in a predetermined direction), and a free positronium beam is generated. As a result, on the positronium beam axis, a monochromatic gamma ray having an energy twice the electron energy and a monochromatic X-ray having a photon energy of $1.3/10^6$ of this gamma ray are generated as irradiation light.

18 Claims, 3 Drawing Sheets

GENERATING METHOD FOR FREE POSITRONIUM RADIATION LIGHT AND APPARATUS USED IN THIS METHOD

TECHNICAL FIELD

This invention relates to a method for simultaneously generating a monochromatic gamma ray beam with high energy and a monochromatic X-ray beam with high energy (hereunder these are collectively called "free positronium radiation light") and an apparatus for the same.

BACKGROUND TECHNIQUE

Conventionally, a laser or synchrotron radiation light (called "SR light" hereunder) is known as a light beam. The laser has a wavelength of the visible light region and its neighboring region. On the other hand, the SR light has a wavelength ranging from infrared rays to an X-ray of a long wavelength.

In the meantime, with the present technique for light beam generation, the generation of light is restricted to the X-ray region of a long wavelength, like in the SR light. In other words, it is impossible to generate an X-ray of a short wavelength and a monochromatic light beam, namely, a monochromatic gamma ray beam, which has photon energy of, for example, 0.1 MeV or more far higher than the X-ray of a short wavelength.

An object of the present invention is, therefore, to provide a generating method and apparatus for generating high energy light beams, namely, a short wavelength X-ray beam and a monochromatic gamma ray beam, which are excellent in the degree of monochrome and which have low noise.

DISCLOSURE OF THE INVENTION

In the present invention, generation of a free positronium beam is accomplished by separately accelerating and storing an electron beam and a positron beam to a predetermined energy and by joining both beams in a predetermined direction, and a free positronium beam is generated. This results in generating, along the positronium beam axis, a monochromatic gamma ray having an energy twice the electron energy and a monochromatic X-ray having a photon energy of $1.3/10^6$ of this gamma ray, as radiation light.

To this end, a generating apparatus is equipped with a set of storage.cooling rings for acceleration, storage and cooling of each of an electron beam and a positron beam and, an accelerator system for injection of the electron beam and the positron beam into both rings, respectively, and a joined portion for joining the electron and positron beams provided at both of the rings.

In this case the electron beam and the positron beam from the accelerator system for injection may be separately stored after they have been accelerated respectively to a predetermined energy by booster accelerators.

THE BEST MODE FOR EMBODYING THE INVENTION

Next, the present invention will be explained in detail with reference to the drawings.

Figure 1:
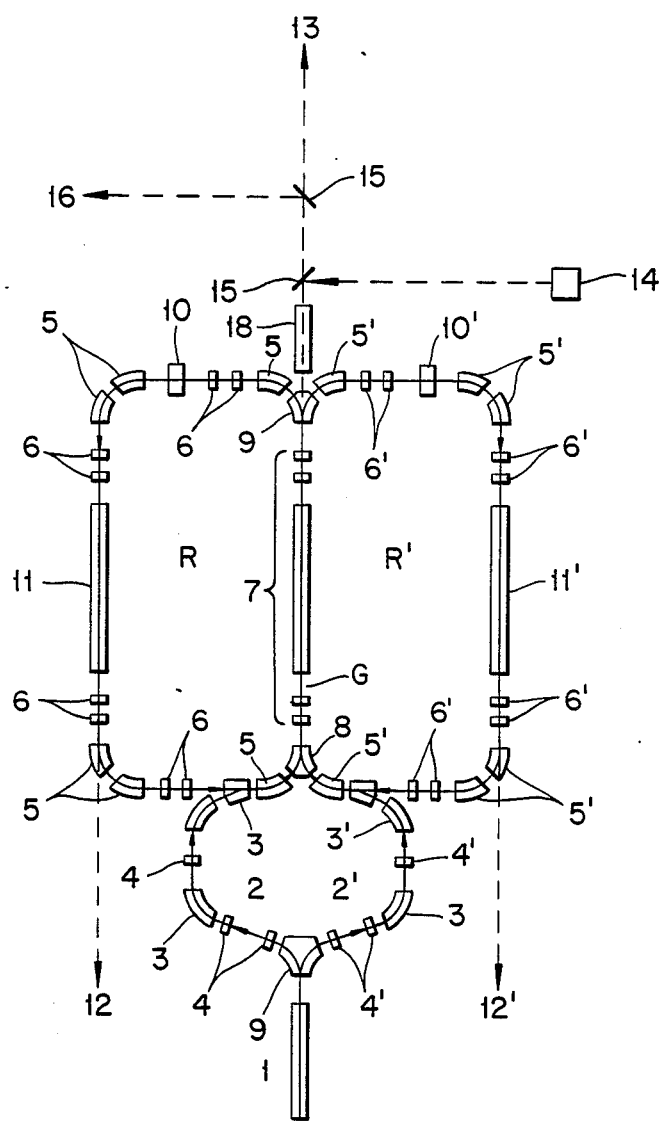
FIG. 1 is a diagram for schematically showing one embodiment of a free positronium-radiation-light generating apparatus according to the present invention.

Referring to FIG. 1, a linear accelerator or microtron, for example, is used as an accelerator system 1 for electron positron injection. This enables acceleration of both electrons and positrons by the use of a single identical accelerator. It is to be noted that separate accelerators may be provided for the electrons and positrons. A deflection magnet 9 for branching is disposed at the exit of the accelerator system 1 for injection. Transmission systems 2 and 2' are equipped with beam deflection magnets 3, 3' and beam convergence elements 4, 4', respectively, to guide an electron beam and a positron beam into an electron-beam storage ring R and a positron-beam storage ring R'.

The electron beam storage.cooling ring R has a beam deflection magnet 5, a beam convergence element 6, a high frequency cavity 10 for electron acceleration and an undulator or wiggler 11 for electron dumping cooling. Similarly, the positron beam storage.cooling ring R' is equipped with a beam deflection magnet 5', a beam convergence element 6', a high frequency cavity 10' for electron acceleration and an undulator or wiggler 11' for electron dumping cooling. An electron.positron joined portion G is formed at a part of the storage.cooling rings R, R', and a beam convergence element 7 is provided at this joined portion G. In addition, a deflection magnet 8 for joining and a deflection magnet 9 for branching are disposed at the entrance and exit of the joined portion, respectively. Further, a cylindrical reflecting mirror 18 for converging a monochromatic X-ray beam is disposed toward the extended line of the joined portion as described later. Also, as illustrated, a light emission device 14 for induction generation of para-positroniums and a reflecting mirror 15 are installed.

Next, the operation of the above-described apparatus will be explained.

Electrons and positrons injected by the injection accelerator system 1 are led to the storage.cooling rings R and R' through the beam transmission systems 2 and 2', respectively, by a magnet 9 for branching. The electrons and positrons are synchrotron-accelerated to a predetermined energy $\gamma m_0 C^2$ at the storage.cooling rings R, R', where $m_0 C^2$ is the electron rest mass energy 0.511 MeV, (MeV: million electron volts) and $\gamma$ is an energy factor of the accelerated electron and is represented as follows:

$\gamma \equiv (1-\beta^2)^{-\frac{1}{2}}$ $\beta \equiv v/c$ v: electron velocity c: velocity of light In the acceleration with the storage.cooling rings R, R', the magnetic fields of the magnet 8 for joining and that of the magnet 9 for branching are slightly shifted from a predetermined magnetic field. As a result, the electrons and positrons separately circulate in the respective rings. The electrons and positrons meander horizontally or vertically or in both directions when they are passing the undulators or wigglers 11, 11', respectively, and irradiate SR light 12, 12'. The electrons and positrons are then supplementarily accelerated at the high frequency cavities 10,10' to be cooled.

In other words, the unification of the energies of the electrons and positrons is made.

When the electron energy reaches predetermined $\gamma m_0 C^2$, the magnetic fields of the magnets 8, 9 are switched to the set value. That is, a joining mode is given. When the magnetic fields of the magnets 8, 9 are thus set at the joining mode, an electron beam and a positron beam join with the result that the energies of the electrons and positrons are unified with the accuracy of about $10^{-4}$ for an extremely short time due to an electron cooling effect based on an electric mutual function between the electrons and positrons. Therefore, the undulator or wiggler 11' is not needed only from the cooling point of view. However, the SR light of the positrons are more excellent in the lowness of noise thereof than that of the electron beam, and in the case of the need for the SR light, it is desirable to dispose the undulator or wiggler 11'.

At the joined portion, parts of the electrons and positrons are coupled to form a two-electron atom called para-positronium so that their respective spins (degree of kinematical freedom corresponding to the rotation of the electrons) are antiparallel. The para-positronium is annihilated at the average lifetime of $1.2 \times 10^{-10}$ seconds and converted into the gamma ray. At this time, the maximum energy of the gamma ray radiated before the joined electron and positron beams is $(1+\beta)\gamma m_0 C^2 \approx 2\gamma m_0 C^2$, and all gamma rays are compressed within a solid angle of $4\pi(1+\beta)^{-2}\gamma^{-2}$ (sr)$\approx 3.1 \times \gamma^{-2}$ (sr) (sr: steradians) and radiated in the form of beam. In other words, a monochromatic gamma ray beam, which has an energy twice the electron energy at maximum, is produced on the axis of the joined electron beam. For example, in the case of electron energy of $\gamma=1000$, i.e., 511 MeV, the gamma ray of the maximum energy 1022 MeV is produced in a beam fashion within a solid angle of $3.1/10^6$ steradians on the joined electron beam axis.

At the joined portion, in addition to para-positronium, ortho-positroniums coupled are generated so that the spins of the electrons, positrons are parallel. However, the average lifetime of the ortho-positroniums is 1000 times long as compared with the para-positronium, and they reach the magnet 9 for branching almost without converting into the gamma ray at the joined portion and instantly dissociate into the electrons and positrons due to an electromagnetic force to stay in the rings. For this reason, no loss is generated. As a result, the electrons and positrons in the rings remain stored.cooled in principle until they are converted into the gamma ray.

The amount of radiation of the gamma ray due to the para-positronium generation is $2.2 \times 10^{-12}$ n_ N_+ $\gamma^{-2}$/sec, where n_ is the electron density of the joined portion and N_+ is the number of the positrons at the joined portion. Although a relativistic long lifetime effect must be taken into account with respect to the effective length of positronium, no problem occurs if the joined portion is fully long.

As described later, since the ortho-positroniums positroniums induction-dissociate to return to the electrons and positrons by an inducing generation manipulation of the para-positroniums, the contribution of the ortho-positroniums for gamma ray radiation is disregarded. Also, although positroniums in an exciting state are generated, this has a long average lifetime to the extent that its contribution to the radiation of the gamma ray can be disregarded.

Meantime, the generation efficiency of free light of the positronium can remarkably be heightened by utilizing an induced generation effect of the para-positronium in the radiation field. If the electrons, positrons at the joined portion are exposed to the light having an energy equal to a coupling energy of 6.8 eV, (eV: electron volts), a wavelength of about $1.8 \times 10^{-5}$ cm, a maximum flux of light of about $5 \times 10^{26}$/cm$^2$/s, the generation rate of the para-positroniums is further increased $(1+\beta)\gamma$ times due to a relativistic effect as compared with a normal induction amplification rate, the radiation amount of the gamma ray becomes about $9 \times 10^{-9}$ n_ N_+ $(1+\beta)\gamma^{-1}$/sec. Also, the radiation density within the forward solid angle one millisteradian of this gamma ray is $9 \times 10^{-12}$ n_·N_+·$(1+\beta)\gamma^{-1}/[4\pi(1+\beta)^{-2}\gamma^{-2}9] \approx 7 \times 10^{-13}$ n_ N_+ $(1+\beta)^3\gamma$. For example, a standard electron storage ring of the degree of $\gamma=1000$, n_=$10^9$/cm$^3$, N_+=$10^{11}$ is employed in the generation of free positronium radiation ray, the radiation amount of the gamma ray is $2 \times 10^9$/sec, and the radiation density per solid angle of one millisteradian is $6 \times 10^{11}$. In the case of the use of a high performance electron storage ring (n =$10^{10}$/cm$^3$, N+=$10^{12}$) under development, the radiation amount, the radiation density of the gamma ray become $2 \times 10^{11}$/sec, $6 \times 10^{13}$/sec, respectively.

As will be understood from the foregoing explanation, the radiation ray of the free positroniums is extremely excellent in a monochromatic state of energy and lowness of noise.

Further, a coupling energy 6.8 eV emitted in the positronium generation is radiated on the joined axis as an X-ray beam, which has the same angle convergence as the monochromatic gamma ray and an energy of $6.8(1+\beta)\gamma \approx 13.6$ $\gamma$eV and is coherent, i.e., as an X-ray laser. For example, in the case of a joined electron beam with acceleration energy of $\gamma=1000$, a monochromatic light laser beam of 13.6 KeV (kiloelectron volts) is radiated on the joined axis at the same time with a monochromatic gamma ray beam. This monochromatic X-ray laser is separated from a monochromatic gamma ray beam 13 by the attachment of the reflecting mirror 15, and a monochromatic X-ray laser 16 excellent in a monochromatic state and lowness of noise can be taken out.

Meantime, electric power of light having the photon number of about $5 \times 10^{26}$/cm$^2$ and a wavelength of $1.8 \times 10^{-5}$ cm to be used for positron-inducing generation becomes equal to or greater than 500 MW/cm$^2$. However, by utilizing the Doppler effect caused due to the antiparallel irradiation of a beam such as a milliwave, a microwave or a laser from the light emitting device 14 for para-positronium inducing generation to the joined electron beam, said electric power can be reduced. Namely, a light beam necessary for irradiation has a wavelength $1.8 \times 10^{-5} \times (1+\beta)\gamma \approx 3.6 \times 10^{-5}\cdot\gamma$(cm), and electric power necessary for radiation is decreased $(1+\beta)-1\gamma^{-1} \approx 0.5\gamma^{-1}$ lines. For instance, for the joined electron beam of $\beta=1000$, a milliwave with a wavelength of $6 \times 10^{-2}$ cm or an SR light may be injected into the joined portion with about 200 kW/cm$^2$ from the light emitting device 14 for para-positronium inducing generation or may be generated as a stationary wave. Since the positronium-inducing generation efficiency is proportional to the number of inputted photons to the joined portion, intensity control of the free positronium radiation light, pulse control, etc. can arbitrarily be performed by increasing or decreasing the input of the milliwave or SR light to the joined portion. Now the photons may invite induction annihilation of generated free positroniums, and the gamma ray generated at this time has a feature that it substantially becomes a monochromatic high-energy gamma-ray laser only of an energy $2\beta m_0 C^2$.

Figure 2:
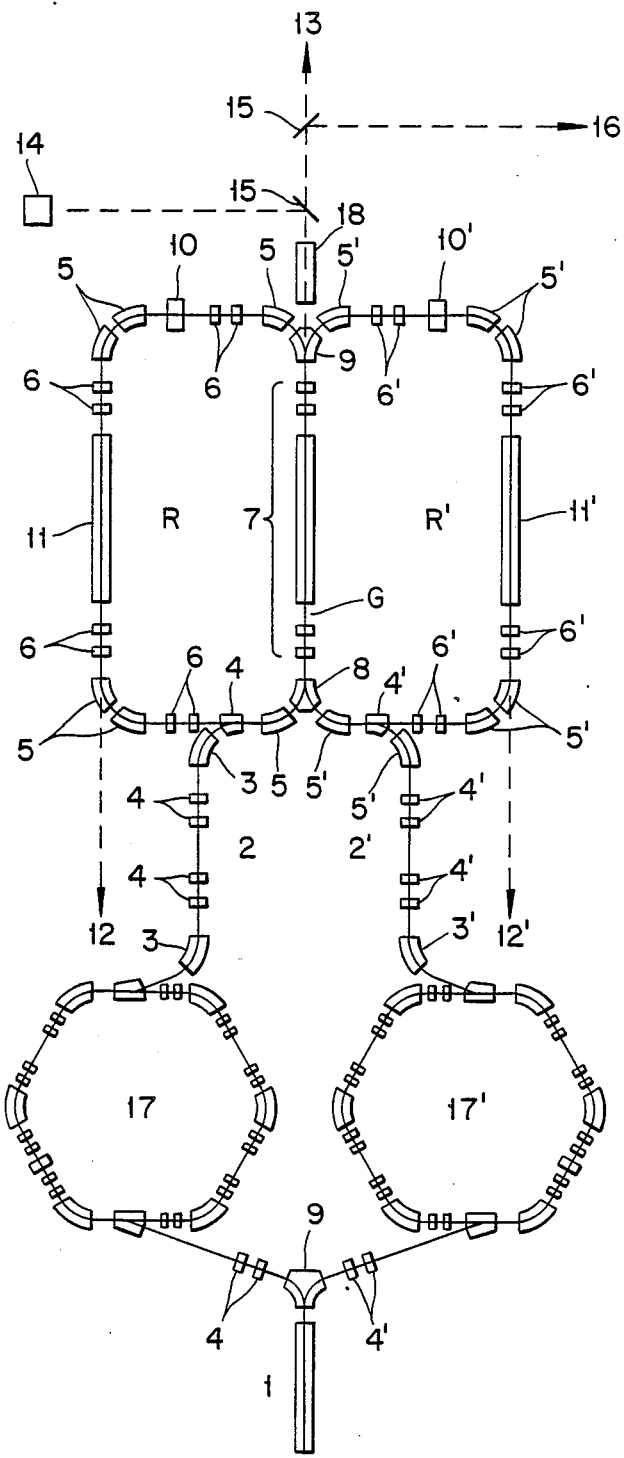
FIG. 2 is a diagram for showing another embodiment of a radiation-light generating apparatus according to the present invention.

Another embodiment of a free-positronium-radiation-ray generating apparatus of the present invention will be shown in FIG. 2. Referring to FIG. 2, in this embodiment, accelerators 17, 17', for example, a synchrotron, for instance, are provided as booster accelerators in order to accelerate electrons and positrons to the energy of $\gamma m_0 C^2$ between the injection accelerator system 1 and the storage.cooling rings R, R' for the electrons and positrons in the embodiment of FIG. 1.

In the embodiment of FIG. 1, it is necessary to operate the storage.cooling rings R, R' in the two-or-three-stage modes of synchrotron acceleration and electron beam cooling and radiation of the gamma ray. However, the synchrotron acceleration is not needed at the storage.cooling rings R, R' according to the embodiment of FIG. 2. For this reason, the monochromatic gamma ray beam and the monochromatic X-ray laser can be produced continuously so as to improve the performance remarkably.

Figure 3A:
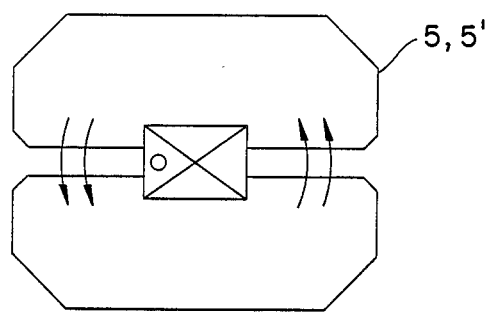
FIG. 3 is a sectional view of doubled structure magnets used for integrating the electron storage.cooling ring and the positron storage.cooling ring.
Figure 3B:
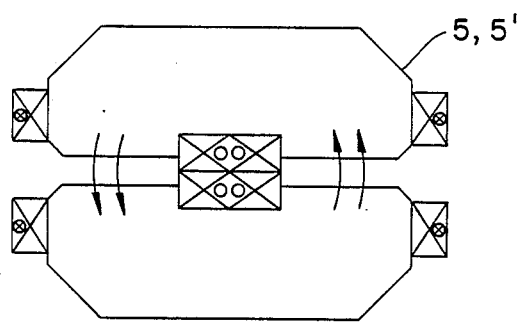
Figure 3C:
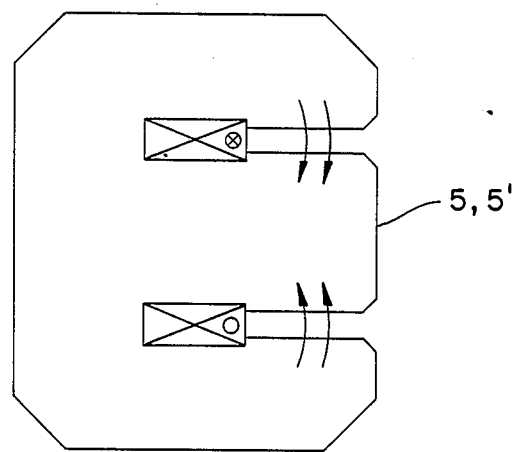

Now, the deflection magnets 5 and 5' for respectively integrally forming the electron storage.cooling ring R and the positron storage.cooling ring R' are illustrated in FIG. 3. In the whole system of this apparatus, two rings are integrated with the structure folded in two and piled up upward and downward using the joined beam axis as a fold. For that reason, this deflection magnet has a doubled structure as shown in the drawings. FIG. 3(a) is a magnet of the form in which all magnets are coupled through a string of coils, and FIGS. 3(b), (c) are both magnets of the form in which individual magnets are separated independently. Any of the magnets is extremely useful for the miniaturization of the apparatus of the present invention.

POSSIBILITY OF INDUSTRIAL UTILIZATION

As has been described above, in the present invention, the simultaneous generation of a monochromatic gamma ray beam and a monochromatic X-ray beam can be achieved, and the invention can be utilized as instruments for research and development in the fields such as elementary particle physics, chemistry, molecule biology.

I claim:

1. A method of generating free positronium-radiation-light by mutual action of an electron beam and a position beam, aid method comprising the steps of:
    injecting said electron beam and said positron beam into a first orbit and a second orbit, respectively;
    holding said electron beam and said positron beam in said first orbit and said second orbit, respectively;
    accelerating said electron beam and said positron beam into an accelerated electron beam and an accelerated positron beam having predetermined energy in said first and said second orbits, respectively;
    forming an overlapped orbit on which said first and said second orbits are partially overlapped; and
    combining said accelerated electron beam with said accelerated positron beam on said overlapped orbit to produce a combined beam to thereby generate said positronium-radiation-light along said combined beam.

2. A method as claimed in claim 1, further comprising the steps of:
    outputting said free positronium-radiation-light from said overlapped orbit; and
    controlling the strength of said free positronium-radiation-light by introducing an electromagnetic wave into said overlapped orbit against said combined beam.

3. A method as claimed in claim 2, wherein said electromagnetic wave is a selected one of a microwave, a milliwave, and a laser light.

4. A method of generating free positronium-radiation-light mutual action of an electron beam and a positron beam, said method comprising the steps of:
    acclerating said electron beam and said position beam into an accelerated electron beam and an accelerated positron beam having a predetermined energy, respectively;
    separately storing said accelerated electron beam and said accelerated positron beam at said predetermined energy;
    injecting said accelerated electron beam and said accelerated positron beam into a first orbit and a second orbit, respectively;
    holding said accelerated electron beam and said accelerated positron beam at said predetermined energy in said first orbit and said second orbit, respectively;
    forming an overlapped orbit on which said first and said second orbits are partially overlapped; and
    combining said accelerated electron beam and said accelerated position beam on said overlapped orbit to produce a combined beam to thereby generate said free positronium-radiation-light along said combined beam.

5. A method as claimed in claim 4, further comprising the steps of:
    outputting said free positronium-radiation-light from said overlapped orbit; and
    controlling the strength of said free positronium-radiation-light by introducing an electromagnetic wave into said overlapped orbit against said combined beam.

6. A method as claimed in claim 5, wherein said electromagnetic wave is a selected one of a microwave, a milliwave, and a laser light.

7. An apparatus for generating a free positronium-radiation-light by mutual action of an electron beam and a positron beam, said apparatus comprising:
    an electron storage ring for accelerating said electron beam into an accelerated electron beam on a first orbit to store said accelerated electron beam at predetermined energy;
    a position storage ring for accelerating said positron beam into an accelerated positron beam on a second orbit to store said accelerated positron beams at predetermined energy;
    a combining part partially at said electron storage ring and said positron storage ring for combining said accelerated electron beam and said accelerated positron beam; and
    means for overlapping said first and said second orbits in said combining part to combining said accelerated electron beam and said accelerated positron beam into a combined beam to thereby to generate said free positronium-radiation-light along said combined beam.

8. An apparatus as claimed in claim 7, wherein said overlapping means comprises;
- a deflecting electromagnet positioned at one end of said combining part for deflecting said accelerated electron beam and said accelerated positron beam by generating a magnetic field to produce said combined beam in said combining part; and
- a branch electromagnet positioned at the other end of said combining part for branching said combined beam into said accelerated electron beam and said accelerated positron beam,
- whereby said deflecting electromagnet is controlled to change the magnetic field strength from one to another to thereby combine said accelerated electron beam and said accelerated positron beam into said combined beam.

9. An apparatus as claimed in claim 7, wherein said electron storage ring comprises a plurality of electron deflecting electromagnets to form said first orbit, said positron storage ring comprises a plurality of positron deflecting electromagnets to form said second orbit, and wherein said electron deflecting electromagnets are combined with said positron deflecting electromagnets, respectively, so as to form combined electromagnets which defied a first path and a second path for said first orbit and said second orbit, respectively, and to thereby combine said electron storage ring with said positron storage ring.

10. An apparatus as claimed in claim 7, wherein said electron storage ring comprises a wiggler for vibrating said first orbit to emit synchrotron radiation light from said accelerated electron beam.

11. An apparatus as claimed in claim 7, wherein said positron storage ring comprises a wiggler for vibrating said second orbit to emit synchrotron radiation light from said accelerated positron beam.

12. An apparatus as claimed in claim 7, further comprising:
- a cylindrical reflecting mirror disposed along said free positronium-radiation-light for converging said free positronium-radiation-light into a converged light.

13. An apparatus for generating a free positronium-radiation-light by mutual action of an electron beam and a positron beam, said apparatus comprising:
- an electron accelerator for accelerating an electron beam into an accelerated electron beam at predetermined energy;
- a positron accelerator for accelerating a positron beam into an accelerated positron beam at predetermined energy;
- an electron storage ring for storing said accelerated electron beam on a first orbit at the predetermined energy;
- a positron storage ring or storing said accelerated positron beam on a second orbit at the predetermined energy;
- a combining part partially formed at said electron storage ring and said positron storage ring for combining said accelerated electron beam and said accelerated positron beam; and
- means for overlapping said first and said second orbits in said combining part to combine said accelerated electron beam and said accelerated positron beam into a combined beam to thereby generate said free positronium-radiation-light along said combined beam.

14. An apparatus as claimed in claim 13, wherein said overlapping means comprises:
- a deflecting electromagnet positioned at one end of said combining part for deflecting said accelerated electron beam and said accelerated positron beam by generating a magnetic field to produce said combined beam in said combining part; and
- a branch electromagnet positioned at another end of said combining part for branching said combined beam into said accelerated electron beam and said accelerated positron beam,
- whereby said deflecting electromagnet is controlled to change the magnetic field strength from one to another to thereby combine said accelerated electron beam and said accelerated positron beam into said combined beam.

15. An apparatus as claimed in claim 13, wherein said electron storage ring comprises a plurality of electron deflecting electromagnets to form said first orbit, said positron storage ring comprises a plurality of positron deflecting electromagnets to form said second orbit, and wherein said electron deflecting electromagnets are combined with said positron deflecting electromagnets, respectively, so as to form combined electromagnets which define a first path and a second path for said first orbit and said second orbit, respectively, and thereby combine said electron storage ring with said positron storage ring.

16. An apparatus as claimed in claim 13, wherein said electron storage ring comprises a wiggler for vibrating said first orbit to emit synchrotron radiation light from said accelerated electron beam.

17. An apparatus as claimed in claim 13, wherein said positron storage ring comprises a wiggler for vibrating said second orbit to emit synchrotron radiation light from said accelerated positron beams.

18. An apparatus as claimed in claim 13, further comprising:
- a cylindrical reflecting mirror disposed along said free positronium-radiation-light for converging said free positronium-radiation-light into a converged light.

* * * * *